United States Patent
Slama et al.

(10) Patent No.: US 8,367,184 B2
(45) Date of Patent: Feb. 5, 2013

(54) STRUCTURED FILMS HAVING ACOUSTICAL ABSORBANCE PROPERTIES

(75) Inventors: David F. Slama, Grant, MN (US); Jonathan H. Alexander, Roseville, MN (US); Graham M. Clarke, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 157 days.

(21) Appl. No.: 12/298,631

(22) PCT Filed: Apr. 27, 2007

(86) PCT No.: PCT/US2007/067577
§ 371 (c)(1),
(2), (4) Date: Oct. 27, 2008

(87) PCT Pub. No.: WO2007/127890
PCT Pub. Date: Nov. 8, 2007

(65) Prior Publication Data
US 2009/0233045 A1      Sep. 17, 2009

Related U.S. Application Data

(60) Provisional application No. 60/745,790, filed on Apr. 27, 2006.

(51) Int. Cl.
*B32B 3/10*      (2006.01)
*B32B 3/24*      (2006.01)
*B32B 3/30*      (2006.01)
*G10K 11/16*     (2006.01)

(52) U.S. Cl. ........ 428/132; 428/119; 428/120; 428/131; 428/137; 428/156; 428/212; 428/213; 428/220; 428/904.4; 181/284; 181/293; 181/296

(58) Field of Classification Search ............. 428/132, 428/131, 119–120, 180; 156/154; 265/529; 4/901, 581–582; 181/284, 288, 290–291, 181/294; 404/36–38; 15/215–217; 108/53.1–53.5; 211/59.4; 248/346.5; 36/28, 29, 37
See application file for complete search history.

(56) References Cited

U.S. PATENT DOCUMENTS

| | | | |
|---|---|---|---|
| 3,092,439 A * | 6/1963 | Harrison | 264/154 |
| 3,231,454 A * | 1/1966 | Williams | 428/132 |
| 3,517,410 A * | 6/1970 | Rapisarda | 425/196 |
| 3,649,430 A | 3/1972 | Lewis et al. | |
| 3,917,772 A | 11/1975 | Hollenbeck | |
| 3,929,135 A * | 12/1975 | Thompson | 604/385.08 |
| 4,025,601 A * | 5/1977 | Keith | 264/291 |
| 4,248,822 A | 2/1981 | Schmidt | |
| 4,591,523 A * | 5/1986 | Thompson | 428/131 |

(Continued)

FOREIGN PATENT DOCUMENTS

| | | |
|---|---|---|
| DE | 19842956 A1 * | 3/2000 |
| EP | 0233673 | 8/1987 |

(Continued)

OTHER PUBLICATIONS

Machine Translation of DE 19842956 A1, Mar. 2000.*

(Continued)

*Primary Examiner* — David Sample
*Assistant Examiner* — Jeff Vonch
(74) *Attorney, Agent, or Firm* — Gregory D. Allen

(57) ABSTRACT

Structured films having acoustical absorbance properties are disclosed. Methods of making and using the structured films are also disclosed.

16 Claims, 4 Drawing Sheets

U.S. PATENT DOCUMENTS

| | | | |
|---|---|---|---|
| 4,627,819 A * | 12/1986 | Burrows | 434/337 |
| 4,629,643 A | 12/1986 | Curro et al. | |
| 4,669,416 A * | 6/1987 | Delgado et al. | 118/503 |
| 4,794,028 A | 12/1988 | Fischer | |
| 4,895,749 A * | 1/1990 | Rose | 428/132 |
| 5,180,620 A * | 1/1993 | Mende | 428/138 |
| 5,200,248 A * | 4/1993 | Thompson et al. | 428/131 |
| 5,233,767 A * | 8/1993 | Kramer | 36/28 |
| 5,614,283 A * | 3/1997 | Potnis et al. | 428/131 |
| 5,635,276 A * | 6/1997 | Biagioli et al. | 428/132 |
| 6,082,489 A * | 7/2000 | Iwao et al. | 181/286 |
| 6,090,089 A * | 7/2000 | Tsuji et al. | 604/385.01 |
| 6,287,665 B1 | 9/2001 | Hammer | |
| 6,627,133 B1 | 9/2003 | Tuma | |
| 6,627,791 B1 * | 9/2003 | Veglio et al. | 604/383 |
| 6,898,901 B2 | 5/2005 | Petroski et al. | |
| 7,059,089 B1 * | 6/2006 | Fontaine | 52/144 |
| 7,467,498 B2 | 12/2008 | Fontaine | |
| 2001/0050197 A1 * | 12/2001 | Wood | 181/292 |
| 2002/0133132 A1 * | 9/2002 | Copat et al. | 604/383 |
| 2002/0170235 A1 * | 11/2002 | Petroski et al. | 49/502 |
| 2004/0087927 A1 * | 5/2004 | Suzuki | 604/378 |
| 2004/0134098 A1 * | 7/2004 | Beck | 36/44 |
| 2004/0161586 A1 | 8/2004 | Cree | |
| 2005/0186392 A1 * | 8/2005 | Fontaine | 428/131 |
| 2005/0284690 A1 * | 12/2005 | Proscia et al. | 181/214 |
| 2007/0029694 A1 | 2/2007 | Cree | |

FOREIGN PATENT DOCUMENTS

| | | |
|---|---|---|
| EP | 0233673 A * | 8/1987 |
| EP | 0294507 | 12/1988 |
| EP | 1040804 | 10/2000 |
| JP | 09314661 | 12/1997 |
| JP | 2811344 | 10/1998 |
| JP | 11-348163 | 12/1999 |
| JP | 2001-249665 | 9/2001 |
| JP | 2006/511367 | 4/2006 |
| WO | WO 00/05707 | 2/2000 |
| WO | WO 00/16726 | 3/2000 |
| WO | WO 01/71116 A1 | 9/2001 |
| WO | WO 2006/078532 | 7/2006 |
| WO | WO 2007/127890 | 11/2007 |

OTHER PUBLICATIONS

PCT International Search Report; International Application No. PCT/US2007/067577 mailed Oct. 30, 2007.
PCT International Search Report; International Application No. PCT/US2007/067578 mailed Nov. 2, 2007.
U.S. Appl. No. 12/298,629 Office Action dated Dec. 28, 2009.
U.S. Appl. No. 12/298,629 Amendment and Response dated Mar. 29, 2010.
Randeberg; Doctoral Thesis, "Perforated Panel Absorbers with Viscous Energy Dissipation Enhanced by Orifice Design" Chapter 3, Norwegian University of Science and Technology, Trondheim, Jun. 2000, pp. 25-48.

* cited by examiner

STRUCTURED FILMS HAVING ACOUSTICAL ABSORBANCE PROPERTIES

CROSS REFERENCE TO RELATED APPLICATIONS

This application is a national stage filing under 35. U.S.C. 371 of PCT/US2007/067577, filed Apr. 27, 2007, which claims priority to U.S. Provisional Application No. 60/745,790, filed Apr. 27, 2006, the disclosure of which is incorporated by reference in its/their entirety herein.

FIELD OF THE INVENTION

The present invention relates to structured films having acoustical absorbance properties and methods of making and using such structured films.

BACKGROUND OF THE INVENTION

There is a continued need in the art for articles that provide acoustical properties including sound absorption properties.

SUMMARY OF THE INVENTION

The present invention is directed to structured films capable of providing acoustical properties to an area including sound absorption properties. According to one exemplary embodiment of the present invention, the structured film comprises a substantially planar film portion having a first major surface, a second major surface, and an average film portion thickness; and a plurality of tubular projections extending from the substantially planar film portion, wherein one or more tubular projections comprise (i) a hole extending from a first projection end above the first major surface into or through the substantially planar film portion, (ii) a projection sidewall surrounding at least a portion of the hole, the projection sidewall having an outer projection sidewall surface, an inner projection sidewall surface, and a projection sidewall thickness, and (iii) a projection length extending a distance from the first projection end to the first major surface, wherein a ratio of the projection length to the average film portion thickness is at least about 3.5. In some embodiments, the ratio of the projection length to the average film portion thickness is at least about 4.0, and as much as about 10.0 or greater.

In a further exemplary embodiment of the present invention, the structured film comprises a substantially planar film portion comprising a thermoformable material having a first major surface, a second major surface, and an average film portion thickness; and a plurality of tubular projections extending from the substantially planar film portion, wherein one or more tubular projections comprise (i) a hole extending from a first projection end above the first major surface into or through the substantially planar film portion, (ii) a projection sidewall surrounding at least a portion of the hole, the projection sidewall comprising the thermoformable material and having an outer projection sidewall surface, an inner projection sidewall surface, and a projection sidewall thickness, and (iii) an end-to-end projection length extending a distance from the first projection end to a second projection end below the second major surface.

In yet a further exemplary embodiment of the present invention, the structured film comprises a substantially planar film portion comprising a thermoformable material having a first major surface, a second major surface, and an average film portion thickness; and a plurality of tubular projections extending from the substantially planar film portion, wherein at least a portion of the tubular projections comprise (i) a hole extending from a first projection end above the first major surface through the substantially planar film portion to a second projection end below the substantially planar film portion providing an opening through the structured film, (ii) a projection sidewall surrounding at least a portion of the hole, the projection sidewall comprising the thermoformable material and having an outer projection sidewall surface, an inner projection sidewall surface, and a projection sidewall thickness, and (iii) an end-to-end projection length extending a distance from the first projection end to the second projection end.

The present invention is also directed to methods of making structured films as well as methods of using the structured films in a variety of applications. In one exemplary embodiment of the present invention, a method of using a structured film comprises a method of absorbing sound in an area, wherein the method comprises the step of surrounding at least a portion of the area with a structured film.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

The present invention is directed to structured films capable of providing acoustical properties including, but not limited to, energy dissipating, reflective/directing or energy transformation (e.g., transformation of kinetic energy of moving particles into heat energy due to friction). As used herein, the term "structured" refers to the topographical features of the film, namely, the presence of tubular projections along at least one major outer surface of a substantially planar film portion of the film. The term "structured" is not used to describe orientation of the material(s) used to form the tubular projections and the substantially planar film portion of the film.

The structured films (1) have exceptional sound absorption properties; (2) have structural features that enable their use in a variety of applications; and (3) can be manufactured in a cost-effective manner. The present invention is also directed to methods of making the structured films, as well as methods of using the structured films in a variety of applications including sound absorbing applications.

Figure 1:
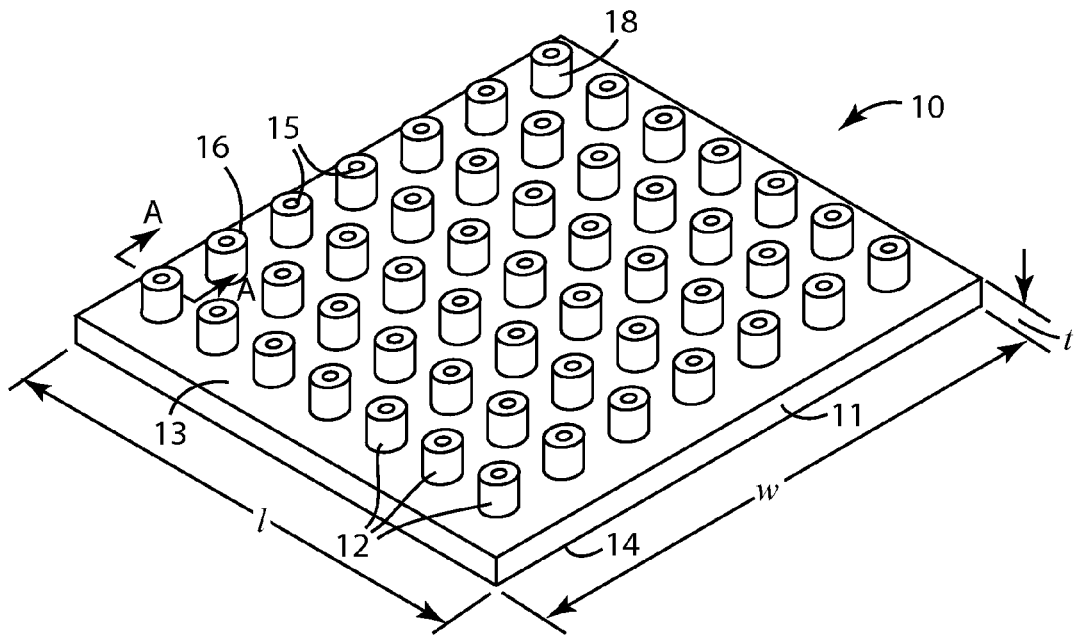
FIG. 1 depicts an exemplary structured film of the present invention.

An exemplary structured film of the present invention is shown in FIG. 1. Exemplary structured film 10 of FIG. 1 comprises a substantially planar film portion 11 and a plurality of tubular projections 12 extending above a first major surface 13 of substantially planar film portion 11. As described in more detail below, tubular projections 12 comprise a hole 15 extending from a first projection end 16 above first major surface 13 into or through substantially planar film portion 11, a projection sidewall 18 surrounding at least a portion of hole 15, and a projection length, L, extending a distance from first projection end 16 to first major surface 13. Further, exemplary structured film 10 can be attached to additional layers and/or components as described below.

I. Three Dimensional Structured Films

As shown by exemplary structured film 10 of FIG. 1, the three dimensional structured films of the present invention comprise a number of components that enable the structured films to be used in a variety of applications. For example, in some embodiments, the structured films of the present invention are capable of providing exceptional acoustical properties to a given substrate and/or area. A description of possible components of the structured films of the present invention, as well as the properties of the resulting structured films is provided below.

A. Structured Film Components

The structured films of the present invention may comprise one or more of the following components.

1. Substantially Planar Film Portion

The structured films of the present invention comprise a substantially planar film portion such as substantially planar film portion 11 of exemplary structured film 10 shown in FIG. 1. The substantially planar film portion has a first major surface, a second major surface opposite the first major surface, and an average film portion thickness, t, extending from the first major surface to the second major surface. As used herein, the term "substantially planar film portion" is used to refer to the portion of structured films of the present invention, which surround and separate the plurality of tubular projections from one another. As shown in FIGS. 1-4, the substantially planar film portion has a planar film portion having an average film portion thickness, t, substantially less than either the overall width w or length l of the structured film.

In the present invention, the "average film portion thickness" (designated t) of the substantially planar film portion is determined by measuring a thickness of the substantially planar film portion at numerous locations between adjacent tubular projections resulting in a total number of film portion thicknesses, x; and calculating the average portion thickness of the x film portion thicknesses. Typically, x is greater than about 3, and desirably ranges from about 3 to about 10. Desirably, each measurement is taken at a location approximately midway between adjacent tubular projections in order to minimize any effect on the measurement by the tubular projections.

The substantially planar film portion of the structured films has an average film portion thickness, which varies depending upon the particular end use of the structured film. Typically, the substantially planar film portion has an average film portion thickness of less than about 508 microns (μm) (20 mils.). In some embodiments, the substantially planar film portion has an average film portion thickness of from about 50.8 μm (2.0 mils.) to about 508 μm (20 mils.). In other embodiments, the substantially planar film portion has an average film portion thickness of from about 101.6 μm (4.0 mils.) to about 254 μm (10 mils.). In yet other embodiments, the substantially planar film portion has an average film portion thickness of from about 101.6 μm (4.0 mils.) to about 152.4 μm (6.0 mils.).

The substantially planar film portion of the structured films may comprise one or more polymeric materials. Suitable polymeric materials include, but are not limited to, polyolefins such as polypropylene and polyethylene; olefin copolymers (e.g., copolymers with vinyl acetate); polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; polycarbonates; polystyrenes; liquid crystalline polymers; polyethylene-co-vinylacetate; polyacrylonitrile; cyclic polyolefins; or a combination thereof. In one exemplary embodiment, the substantially planar film portion comprises a polyolefin such as polypropylene, polyethylene, or a blend thereof.

The substantially planar film portion may further comprise one or more additives as described below. When present, the substantially planar film portion typically comprise at least 75 weight percent of any one of the above-described polymeric materials with up to about 25 weight percent of one or more additives. Desirably, the substantially planar film portion comprises at least 80 weight percent, more desirably at least 85 weight percent, at least 90 weight percent, at least 95 weight percent, and as much as 100 weight percent of any one of the above-described polymeric materials, wherein all weights are based on a total weight of the substantially planar film portion.

Various additives may be added to a polymer melt formed from one or more of the above-referenced polymers and extruded to incorporate the additive into the substantially planar film portion. Typically, the amount of additives is less than about 25 wt %, desirably, up to about 5.0 wt %, based on a total weight of the structured film. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting substantially planar film portion, adjust viscosity, or modify the thermal properties of the substantially planar film portion or confer a range of physical properties derived from the physical property activity of the additive including electrical, optical, density-related, liquid barrier or adhesive tack related properties.

In one exemplary embodiment of the present invention, the substantially planar film portion comprises a single layer of thermoformable material forming the first and second major surfaces and having the above-described average film portion thickness, wherein the thermoformable material comprises one or more of the above-mentioned polymers and optional additives. In a further exemplary embodiment of the present invention, the substantially planar film portion comprises a single layer of thermoformable material forming the first and second major surfaces and having the above-described average film portion thickness, wherein the first and second major surfaces are exposed (e.g., are not covered) so as to be positionable and/or attachable to a desired substrate.

2. Tubular Projections

The structured films of the present invention further comprise a plurality of tubular projections extending above the first major surface of the substantially planar film portion such as tubular projections 12 of exemplary structured film 10 shown in FIG. 1. The tubular projections are desirably formed from the same thermoformable composition used to form the above-described substantially planar film portion. In one desired embodiment, the substantially planar film portion and the plurality of tubular projections comprise a continuous, thermoformed structure formed from a single thermoformable composition comprising one or more of the above-mentioned polymers and optional additives.

In other desired embodiments, the substantially planar film portion and the plurality of tubular projections (i) comprise a continuous, thermoformed structure formed from a single thermoformable composition, and (ii) are free of post film-forming, projection-forming orientation. As used herein, the term "post film-forming, projection-forming orientation" is used to describe conventional processes used to form projections and/or openings in a film. Such conventional processes include, but are not limited to, a thermoforming step used to form projections in a previously solidified film structure (e.g., not a molten film extrudate), a needle-punching step, or other film puncturing step.

The plurality of tubular projections may be uniformly distributed over the first major surface of the substantially planar film portion or randomly distributed over the first major surface. In some embodiments, the plurality of tubular projections are uniformly distributed over the first major surface (and optionally a corresponding portion of the second major surface) of the substantially planar film portion.

In one exemplary embodiment, the structured film of the present invention comprises a plurality of tubular projections extending from the substantially planar film portion, wherein one or more tubular projections comprise (i) a hole extending from a first projection end above the first major surface into or through the substantially planar film portion, (ii) a projection sidewall surrounding at least a portion of the hole, the projection sidewall having an outer projection sidewall surface, an inner projection sidewall surface, and a projection sidewall thickness, and (iii) a projection length, L, extending a distance from the first projection end to the first major surface, wherein a ratio of the projection length, L, to the average film portion thickness, t, is at least about 3.5. In other embodiments, the ratio of the projection length, L, to the average film portion thickness, t, is at least about 4.0. In yet other embodiments, the ratio of the projection length, L, to the average film portion thickness, t, is from about 4.0 to about 10.0.

The tubular projections may have a substantially similar projection length that varies from film to film depending on the ultimate end use of a given structured film. Typically, the tubular projections have a projection length, L, ranging from about 25.4 µm (1 mil) to about 1.27 cm (500 mil), more typically, from about 50.8 µm (2 mil) to about 2.54 mm (100 mil), and even more typically, from about 508 µm (20 mil) to about 1.02 mm (40 mil).

The tubular projections may be further described in terms of their projection hole length, projection hole diameter, and projection sidewall thickness, each dimension of which may vary depending on the ultimate end use of a given structured film. Typically, the tubular projections have a projection hole length ranging from about 25.4 µm (1 mil) to about 1.32 cm (520 mil), more typically, from about 50.8 µm (2 mil) to about 2.79 mm (110 mil), and even more typically, from about 508 µm (20 mil) to about 1.14 mm (45 mil); a projection hole diameter ranging from about 25.4 µm (1 mil) to about 6.35 mm (250 mil), more typically, from about 25.4 µm (1 mil) to about 2.54 mm (100 mil), and even more typically, from about 25.4 µm (1 mil) to about 254 µm (10 mil); and a projection sidewall thickness ranging from about 25.4 µm (1 mil) to about 508 µm (20 mil), more typically, from about 25.4 µm (1 mil) to about 254 µm (10 mil), and even more typically, from about 25.4 µm (1 mil) to about 127 µm (5 mil).

The tubular projections may be further described in terms of a projection sidewall thickness in relation to the average film portion thickness, t, described above. In one exemplary embodiment, at least a portion of the tubular projections have a projection sidewall thickness equal to or greater than the average film portion thickness, t, of the substantially planar film portion.

As shown in FIGS. 2A-2F, the tubular projections may have a variety of shapes and cross-sectional configurations. In some embodiments, the tubular projections have a second projection end positioned below the second major surface of the substantially planar film portion. In these embodiments, the structured films of the present invention comprise a plurality of tubular projections extending from the substantially planar film portion, wherein one or more tubular projections comprise (i) a hole extending from a first projection end above the first major surface into or through the substantially planar film portion, (ii) a projection sidewall surrounding at least a portion of the hole, the projection sidewall having an outer projection sidewall surface, an inner projection sidewall surface, and a projection sidewall thickness, and (iii) an end-to-end projection length extending a distance from the first projection end to a second projection end below the second major surface. For example, as shown in FIGS. 2A and 2C-2F, exemplary tubular projections 12 comprise a second end 17 positioned below second major surface 14 of substantially planar film portion 11.

In some embodiments in which one or more tubular projections have a second end below the second major surface of the substantially planar film portion of the structured film, one or more tubular projections desirably have an upper projection length extending a distance from the first projection end to the first major surface, wherein a ratio of the upper projection length (e.g., projection length, L) to the average film portion thickness, t, is at least about 3.5. More desirably, the ratio of the upper projection length (e.g., projection length, L) to the average film portion thickness, t, is from about 4.0 to about 10.0.

The tubular projections may have a projection sidewall thickness that varies along the projection length (e.g., projection length, L, or an end-to-end projection length). As shown in FIGS. 2A-2F, exemplary tubular projections 12 may comprise a projection sidewall thickness that remains substantially constant along the projection length (see, for example, FIG. 2B) or a projection sidewall thickness that varies along the projection length (see, for example, FIGS. 2A and 2C-2F). In one exemplary embodiment, one or more tubular projections have a first wall thickness at a projection base located proximate the first major surface, a second wall thickness at the first projection end, and a third wall thickness at a projection midsection located between the projection base and the first projection end, wherein the first and second wall thicknesses are greater than the third wall thickness (see, for example, FIG. 2F). In another exemplary embodiment, one or more tubular projections have a first wall thickness at a projection base located proximate the first major surface, a second wall thickness at the first projection end, and a third wall thickness at a projection midsection located between the projection base and the first projection end, wherein the first and second wall thicknesses are less than the third wall thickness (see, for example, FIG. 2E).

Figure 2A:
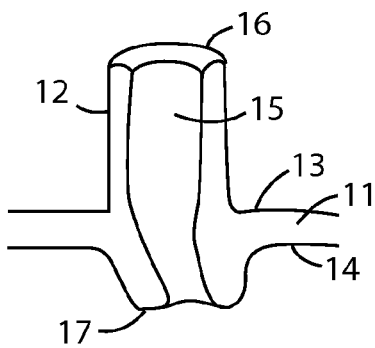
FIGS. 2A-2F depict possible cross-sectional configurations of exemplary tubular projections on a substantially planar film portion of the exemplary structured film of FIG. 1 along line A-A.
Figure 2B:
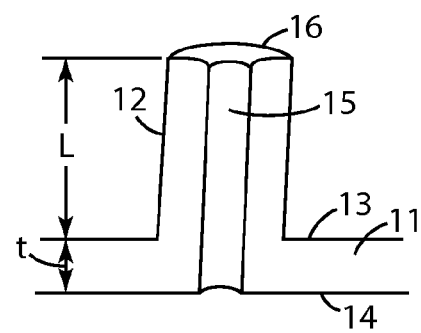
Figure 2C:
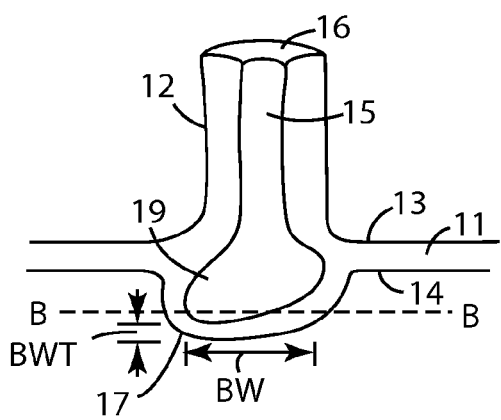

In further exemplary embodiments of the present invention, one or more tubular projections have a first cross-sectional area above the first major surface of the substantially planar film portion, a second cross-sectional area within the substantially planar film portion, and a third cross-sectional area below the second major surface of the substantially planar film portion, wherein the first cross-sectional area is less than the second and third cross-sectional areas (see, for example, FIG. 2C). In some embodiments, one or more tubular projections have a bubble portion (e.g., bubble portion 19 shown in FIG. 2C) in fluid communication with the hole (e.g., hole 15) extending through the tubular projection. In these embodiments, the bubble portion can be present (i) within the substantially planar film portion, (ii) below the second major surface, or (iii) both (i) and (ii) (see, for example, FIG. 2C). In some further embodiments, a lower portion of the bubble portion can be removed to provide an opening extending through the structured film from the first projection end to the second projection end. For example, a portion of bubble portion 19 along second end 17 of tubular projection 12 shown in FIG. 2C may be removed by cutting bubble portion 19 along dashed line B-B shown in FIG. 2C.

It should be noted that the tubular projections may have an outer tubular projection cross-sectional configuration that varies depending on the desired cross-sectional configuration and the type of tooling used to form the tubular projections. For example, the tubular projections may have an outer tubular projection cross-sectional shape in the form of a circle, an oval, a polygon, a square, a triangle, a hexagon, a multi-lobed shape, or any combination thereof.

In other exemplary embodiments of the present invention, one or more tubular projections have a hole (e.g., hole 15) extending completely through the substantially planar film portion (with or without the need to remove a portion of the tubular projection as described above). As shown in FIGS. 2A-2B and 2D-2F, exemplary tubular projections 12 comprise hole 15 that extends along the projection length from first projection end 16 to second projection end 17. As shown in FIGS. 2A-2B and 2D-2F, a cross-sectional area of hole 15 can vary (see, for example, FIGS. 2A and 2D-2F) or remain substantially constant (see, for example, FIG. 2B) along the projection length from first projection end 16 to second projection end 17.

In one desired embodiment, the structured film comprises a plurality of tubular projections extending from the substantially planar film portion, wherein at least a portion of the tubular projections comprise (i) a hole extending from a first projection end above the first major surface through the substantially planar film portion to a second projection end below the substantially planar film portion providing an opening through the structured film, (ii) a projection sidewall surrounding at least a portion of the hole, the projection sidewall having an outer projection sidewall surface, an inner projection sidewall surface, and a projection sidewall thickness, and (iii) an end-to-end projection length extending a distance from the first projection end to the second projection end.

Typically, the tubular projections extend substantially perpendicular to the substantially planar film portion as shown in FIGS. 2A-2F; however, other orientations of tubular projections relative to the substantially planar film portion are within the scope of the present invention.

The tubular projections may be present along one or both major surfaces of the substantially planar film portion of the structured film at a tubular projection density that varies depending on the desired tubular projection density, and the end use of the structured film. In one exemplary embodiment, the tubular projections are present along one or both major surfaces of the substantially planar film portion of the structured film at a tubular projection density of up to about 1000 projections/cm$^2$ of outer surface area of the substantially planar film portion. Typically, the tubular projections are present along one or both major surfaces of the substantially planar film portion of the structured film at a tubular projection density of from about 10 projections/cm$^2$ to about 300 projections/cm$^2$ of outer surface area of the substantially planar film portion.

3. Optional Additional Layers

The structured films of the present invention may comprise one or more optional layers in combination with the above-described structured film components. One or more additional layers may be present (i) on and/or in contact with tubular projection ends extending above the first major surface of the substantially planar film portion of the structured film (e.g., first projection ends 16), (ii) on and/or in contact with tubular projection ends extending below the second major surface of the substantially planar film portion (e.g., second projection ends 17), (iii) on and/or in contact with the second major surface of the substantially planar film portion (e.g., second major surface 14), (iv) both (i) and (ii), or (v) both (i) and (iii).

Suitable additional layers include, but are not limited to, a fabric layer (e.g., woven, nonwoven, and knitted fabrics); a paper layer; a color-containing layer (e.g., a print layer); a sub-micron fiber layer such as those disclosed in U.S. Patent Application Ser. No. 60/728,230, the subject matter of which is hereby incorporated by reference in its entirety; foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof.

Figure 3:
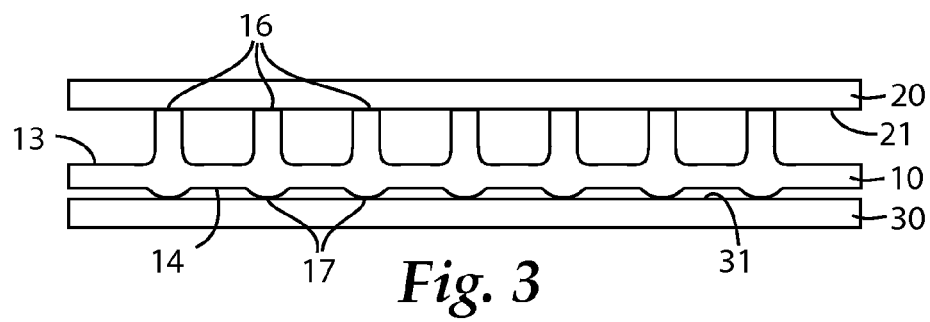
FIG. 3 depicts a side view of an exemplary structured film of the present invention attached to additional layers.

In one exemplary embodiment, a first additional layer is positioned over and attached to the first projection ends of tubular projections of a structured film of the present invention. Such a composite article is shown in FIG. 3. As shown in FIG. 3, a lower outer surface 21 of first additional layer 20 is on and in contact with first projection ends 16 of exemplary structured film 10. In this exemplary embodiment, first additional layer 20 may comprise, for example, a color-containing layer, a nonwoven fabric, a woven fabric, a knitted fabric, a foam layer, a film, a paper layer, a layer of particles, a foil layer, a decorative fabric layer, a membrane, a netting, a mesh, a wiring or tubing network; or any combination thereof.

Figure 4:
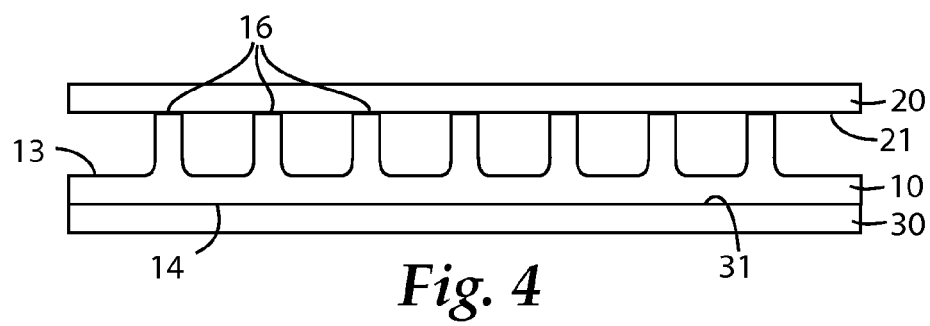
FIG. 4 depicts a side view of another exemplary structured film of the present invention attached to additional layers.

In a further exemplary embodiment, a second additional layer may be positioned over and attached to the second major surface or the second projection ends of the tubular projections of a structured film of the present invention. Such composite articles are shown in FIGS. 3-4. As shown in FIG. 3, an upper outer surface 31 of second additional layer 30 is on and in contact with second projection ends 17 of exemplary structured film 10. In this exemplary embodiment, the second additional layer may comprise, for example, a color-containing layer, a nonwoven fabric, a woven fabric, a knitted fabric, a foam layer, a film, a paper layer, a layer of particles, a foil layer, a decorative fabric layer, a membrane, a netting, a mesh, a wiring or tubing network; or any combination thereof.

As shown in FIG. 4, a lower outer surface 21 of first additional layer 20 is on and in contact with first projection ends 16 of exemplary structured film 10, while an upper outer surface 31 of second additional layer 30 is on and in contact with second major surface 14 of exemplary structured film 10.

4. Attachment Devices

The structured films of the present invention (or composite articles containing a structured film) may further comprise one or more attachment devices to enable the structured film (or composite article) to be attached to a substrate. For example, an adhesive may be used to attach the structured film (or composite article) to a given substrate. Suitable adhesives include, but are not limited to, pressure sensitive adhesives (PSAs), heat-activatable adhesives, or combinations thereof. In addition to adhesives, other attachment devices may be used. Suitable attachment devices include, but are not limited to, any mechanical fastener such as screws, nails, clips, staples, stitching, thread, hook and loop materials, etc.

The one or more attachment devices may be used to attach the structured film (or composite article) to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

II. Methods of Making Multilayer Articles

The present invention is also directed to methods of making the above-described structured films and composite articles containing the same. In one embodiment of the present invention, the method of making a structured film comprises extruding a sheet of molten extrudate from a die; bringing the molten extrudate into contact with a tooling so as to cause a portion of the molten extrudate to enter into a plurality of holes located on a tooling outer surface resulting in (i) an air pressure differential between a higher air pressure within one or more holes of the tooling and a lower air pressure on an outer surface of the molten extrudate opposite the tooling, and (ii) formation of a plurality of projections along a molten extrudate surface; allowing air within the one or more holes of the tooling to move in a direction toward the outer surface of the molten extrudate opposite the tooling so as to (i) reduce the air pressure differential and (ii) form a projection hole within one or more of the plurality of projections; and cooling the molten extrudate and plurality of projections to form a structured film comprising a substantially planar film portion having first and second major surfaces and a plurality of tubular projections extending from at least the first major surface.

In the above exemplary method of making a structured film, the bringing step may comprise nipping the molten extrudate between the tooling and a nip roll, wherein the tooling comprises a tooling roll. Further, the allowing step may comprise rotating the tooling roll and nip roll so that the nip roll is not positioned over the outer surface of the molten extrudate opposite the tooling. In any of the exemplary methods of making a structured film, one or more process parameters may be adjusted so that the allowing step results in the projection hole within one or more of the tubular projections to extend from a first projection end into or through the substantially planar film portion. Process parameters that can be adjusted include, but are not limited to, an extrudate composition, an extrudate temperature, a tooling temperature, a tooling speed, a tooling hole depth, a molten extrudate sheet thickness, or any combination thereof.

In other exemplary methods of making a structured film, one or more process parameters may be adjusted so that the allowing step results in a projection hole within one or more tubular projections that extends from a first projection end into or through the substantially planar film portion so as to form a bubble portion in fluid communication with the projection hole. In this embodiment, the bubble portion may be positioned (i) within the substantially planar film portion, (ii) below the second major surface of the substantially planar film portion, or (iii) both (i) and (ii). Process parameters that can be adjusted to form a bubble portion include, but are not limited to, an extrudate composition, an extrudate temperature, a tooling temperature, a tooling speed, a tooling hole depth, a molten extrudate sheet thickness, or any combination thereof.

In some embodiments in which a bubble portion is formed within one or more tubular projections, the method of making a structured film may further comprise opening the bubble portion so as to provide an opening extending completely through one or more of the tubular projections. The step of opening the bubble portion may comprise removing a tip of the bubble portion (e.g., cutting a tip from a lower surface of the bubble portion), puncturing the bubble portion (e.g., with a needle or other sharp object), pressurizing the projection hole, heating the tip of the bubble portion, or any combination of the above-described opening steps.

In other exemplary methods of making a structured film, one or more process parameters are adjusted so that the allowing step results in a projection hole within one or more tubular projections that extends from a first projection end through the substantially planar film portion so as to provide an opening extending through one or more tubular projections (e.g., without the need for the above-described opening step). Again, process parameters that can be adjusted to form an opening extending completely through one or more tubular projections include, but are not limited to, an extrudate composition, an extrudate temperature, a tooling temperature, a tooling speed, a tooling hole depth, a molten extrudate sheet thickness, or any combination thereof.

In yet further exemplary methods of making a structured film, one or more of the above-mentioned process parameters may be adjusted so that the allowing step results in one or more tubular projections extending from above the first major surface of the structured film to below the second major surface of the structured film. In this embodiment, the method may further comprise, after the cooling step, removing at least a portion of thermoformed material below the second outer surface of the structured film, if necessary, so as to provide an opening extending completely through one or more tubular projections of the structured film from a first projection end above the first major surface to a second projection end below the second major surface. In this embodiment, the method may also optional comprise a step wherein substantially all of the thermoformed material located below the second major surface of the structured film is removed so that the structured film comprises a plurality of tubular projections along only a first major surface of the structured film.

In one desired embodiment, the method of making a structured film comprises the steps of extruding molten extrudate from a die into a nip formed between a rotating tooling roll and a rotating nip roll; forcing a portion of the molten extrudate into a plurality of holes located in the rotating tooling roll resulting in (i) an air pressure differential between a higher air pressure within one or more holes of the rotating tooling roll and a lower air pressure on an outer surface of the molten extrudate opposite the rotating tooling roll, and (ii) formation of a plurality of projections along a molten extrudate surface; rotating the tooling and nip rolls so as to allow air within the one or more holes of the rotating tooling roll to move in a direction toward the outer surface of the molten extrudate opposite the rotating tooling roll so as to form a projection hole within one or more of the plurality of projections; and cooling the molten extrudate and plurality of projections to a temperature below a softening temperature of the molten extrudate and plurality of projections. This exemplary method may be performed using an apparatus such as exemplary apparatus 50 shown in FIG. 5.

Figure 5:
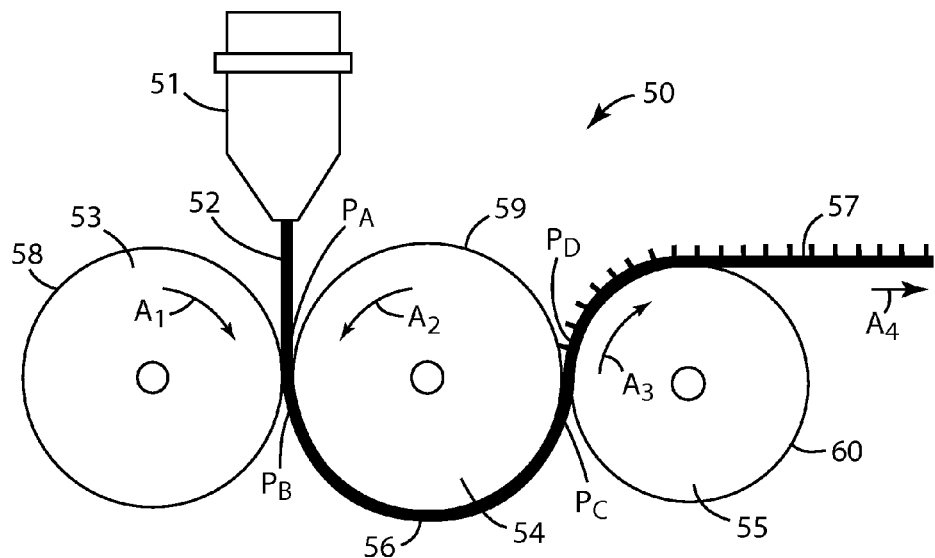
FIG. 5 depicts a schematic diagram of an exemplary apparatus suitable for forming a structured film of the present invention.

As shown in FIG. 5, exemplary apparatus 50 comprises a die assembly 51 from which a molten extrudate 52 exits. Molten extrudate 52 proceeds to point $P_A$ where molten extrudate 52 passes between nip roll 53 rotating in a first direction as noted by arrow $A_1$ and tooling roll 54 rotating in an opposite direction as noted by arrow $A_2$. At point $P_A$, nip roll 53 forces a portion of molten extrudate 52 into holes (not shown) within an outer surface 59 of tooling roll 54. Outer surface 58 of nip roll 53 is typically smooth and is optionally coated with a release material (e.g., a silicone or PTFE). As molten extrudate 52 fills holes (not shown) in outer surface 59 of tooling roll 54 due to force by outer surface 58 of nip roll 53, air pressure within individual holes (not shown) increases, forming an air pressure differential between a higher air pressure within the individual holes (not shown) and a lower air pressure on outer surface 56 of molten extrudate 52 opposite tooling roll 54.

As nip roll 53 and tooling roll 54 rotate, outer surface 58 of nip roll 53 is displaced from outer surface 56 of molten extrudate 52, which allows air within individual holes (not shown) to move through molten extrudate within the individual holes (not shown) toward outer surface 56 of molten extrudate 52 (i.e., toward the lower air pressure). At about point $P_B$, molten extrudate within individual holes (not shown) of outer surface 59 of tooling roll 54 begins to harden. It is believed that molten extrudate adjacent outer surface 59 of tooling roll 54 and individual hole sidewall surfaces hardens prior to a central portion of molten extrudate in a central location of individual holes. As molten extrudate 52 moves from point $P_B$ to point $P_C$ along outer surface 59 of tooling roll 54, the above-described air movement causes a hole to develop within the molten extrudate, which quickly moves toward outer surface 56 of molten extrudate 52. As described above, the air movement may result in (i) a hole extending into or through a substantially planar film portion of molten extrudate 52, (ii) a bubble formed within and/or below the substantially planar film portion of molten extrudate 52, (iii) a hole extending completely through the substantially planar film portion of molten extrudate 52, (iv) a second projection end below a second major surface of the substantially planar film portion of molten extrudate 52, or (v) any combination of (i) to (iv).

At about point $P_C$, molten extrudate 52 and tubular projections 12 formed therein are substantially hardened. As molten extrudate 52 with tubular projections 12 therein moves along outer surface 59 of tooling roll 54, outer surface 56 of substantially hardened molten extrudate 52 comes into contact with outer surface 60 of take-off roll 55 rotating in a direction as noted by arrow $A_3$. At point $P_D$, substantially hardened molten extrudate 52 separates from outer surface 59 of tooling roll 54 and proceeds in a direction as noted by arrow $A_4$ along outer surface 60 of take-off roll 55 resulting in structured film 57 having tubular projections 12 therein.

The disclosed exemplary methods of making structured films of the present invention may be used to form structured films comprising any of the above-mentioned polymeric materials and optional additives. Typically, the thermoforming method step involves melt extruding a film-forming thermoformable material at a melt extrusion temperature ranging from about 120° C. to about 370° C.

A key advantage of the disclosed methods of making structured films of the present invention over conventional methods of making perforated films is the ability to make a structured film having a relatively large hole depth and tubular projection length, while maintaining a thin substantially planar film portion. Being able to decouple the hole depth and tubular projection length from the thickness of the substantially planar film portion provides the ability to produce a new generation of structured films for a variety of applications. For example, increased hole length provides advantages such as an increase of air mass and friction drag through tubular projections as a sound wave transmits through the hole. Decoupling the hole length and tubular projection length from the thickness of the substantially planar film portion also allows added latitude in developing products with increased acoustic mass resistance independent of the bending stiffness of the film.

The disclosed methods of making structured films of the present invention also provide opportunities for producing structured films having relatively large hole depth/hole diameter ratios that have not been achievable in low-cost manufacturing operations prior to the present invention. For example, in one exemplary embodiment, the disclosed methods are capable of producing structured films wherein at least a portion of the tubular projections have a projection hole length to projection hole diameter ratio of at least about 1:1. In other exemplary embodiments, the disclosed methods are capable of producing structured films wherein at least a portion of the tubular projections have a projection hole length to projection hole diameter ratio of at least about 3:1, and as much as 5:1 and higher.

Further, the ability to provide a relatively thin substantially planar film portion allows for lower basis weight films, which can be advantageous in weight conscious applications. A lower basis weight for the structured films of the present invention also translates into lower raw materials usage and lower manufacturing costs. The disclosed methods are capable of producing structured films wherein at least a portion of the tubular projections have a projection hole length to average film portion thickness ratio of at least about 1.1:1, and in some embodiments, a projection hole length to average film portion thickness ratio of at least about 5:1, and in some embodiments, a projection hole length to average film portion thickness ratio of at least about 10:1 or higher.

The disclosed methods of making structured films of the present invention may utilize a tooling so as to produce tubular projections having a projection length, L, as described above. For example, a suitable tooling may comprise a plurality of holes in an outer surface of the tooling, wherein the holes have an average tooling hole depth of up to about 1.5 cm (588 mil). In other embodiments, a suitable tooling may comprise holes have an average tooling hole depth of from about 27.9 μm (1.1 mil) to about 3.0 mm (117 mil), and in other embodiments, an average tooling hole depth of from about 747 μm (29.4 mil) to about 1.5 mm (58.8 mil).

Suitable toolings may also have holes therein, wherein the holes have one or more hole cross-sectional shapes so as to form tubular projections having a desired cross-sectional shape. Suitable hole cross-sectional shapes include, but are not limited to, a circle, an oval, a polygon, a square, a triangle, a hexagon, a multi-lobed shape, or any combination thereof.

In addition, suitable toolings may have any desired density of holes along an outer surface of the tooling (e.g., in outer surface 59 of tooling roll 54). For example, a tooling may have a hole density of up to about 1000 holes/cm² of outer surface area of the tooling. Typically, the tooling has a hole density ranging from about 10 holes/cm² to about 300 holes/cm² of outer surface area of the tooling.

The disclosed methods of making structured films may further comprise attaching one or more additional layers to the structured film. In one exemplary embodiment, the method of making a structured film comprises, prior to the above-described cooling step, contacting first projection ends of tubular projections, second projection ends of tubular projections, the second major surface of the substantially planar film portion, or a combination thereof with at least one additional layer. In other exemplary embodiments, the method of making a structured film comprises attaching an additional layer to the structured film after formation of the structured film (e.g., using a heat lamination process step). As discussed above, additional layer may comprise, but are not limited to, a color-containing layer, a nonwoven fabric, a woven fabric, a knitted fabric, a foam layer, a film, a paper layer, a layer of particles, a foil layer, a decorative fabric layer, a membrane, a netting, a mesh, a wiring or tubing network; or a combination thereof.

In addition to the above-described steps of forming a structured film, the disclosed methods of making a structured film may include one or more of the following process steps:

(1) advancing the structured film along a process pathway toward further processing operations;

(2) bringing one or more additional layers into contact with an outer surface of the structured film;

(3) removing a portion of one or more tubular projections extending below the second major surface of the structured film to form an opening extending a complete length of the tubular projections;

(4) removing any portion of one or more tubular projections extending below the second major surface of the structured film so that the tubular projections do not extend below the second major surface of the structured film;

(5) removing a portion of one or more tubular projections extending above the first major surface of the structured film;

(6) coating the structured film with a surface treatment or other composition (e.g., a fire retardant composition, an adhesive composition, or a print layer);

(7) attaching the structured film to a cardboard or plastic tube;

(8) taking-up the structured film in the form of a roll;

(9) slitting the structured film to form two or more slit rolls;

(10) applying a release liner over an exposed pressure-sensitive adhesive layer, when present; and

(11) attaching the structured film to another substrate via an adhesive or any other attachment device including, but not limited to, clips, brackets, bolts/screws, nails, and straps.

III. Methods of Using Structured Films

The structured films (and composite articles containing a structured film) of the present invention may be used in a variety of applications. The structured films are particularly useful in acoustical applications such as sound absorbing and sound barrier applications. In one exemplary embodiment, the method of using a structured film comprises a method of absorbing sound in an area, wherein the method comprises the steps of surrounding at least a portion of the area with a structured film. In some embodiments, an entire area may be surrounded by a structured film alone or in combination with one or more optional layers as described above.

The step of surrounding an area may comprise positioning a structured film over at least a portion of the area, wherein the structured film comprises any of the above-described structured films either alone or in combination with one or more additional layers. In some embodiments, the surrounding step may comprise positioning a structured film or a composite article containing a structured film over at least a portion of the area. The surrounding step may further comprise the step of attaching the structured film (or a composite article containing a structured film) to a substrate. Any of the above-described attachment devices may be used to attach the structured film (or a composite article containing a structured film) to a given substrate. Suitable substrates may include, but are not limited to, a wall of a building, a ceiling of a building, a building material for forming a wall or ceiling of a building, a metal sheet, a glass substrate, a door, a window, a vehicle component, a machinery component, an electronic device (e.g., printers, hard drives, etc.), or an appliance component.

In other embodiments of the present invention, the method of using a structured film comprises a method of providing a sound barrier between a sound-generating object and an area. In this exemplary method, the method may comprise the steps of providing a structured film (or a composite article containing a structured film) between the sound-generating object and the area. The sound-generating object may be any object that generates sound including, but not limited to, a vehicle motor, a piece of machinery, an appliance motor or other moving component, an electronic device such as a television, an animal, etc.

The area in either of the above exemplary methods of using a structured film (or a composite article containing a structured film) may be any area in which sound is to be absorbed and/or restricted from. Suitable areas may include, but are not limited to, an interior of a room; an interior of a vehicle; a piece of machinery; an appliance; a separate sound reduced area of an office or industrial area; a sound recording or reproduction area; the interior of a theatre or concert hall; an anechoic, analytical or experimental room or chamber where sound would be detrimental; and earmuffs or ear covering for isolating and/or protecting ears from noise.

The structured films of the present invention may also be used as a resistive membrane layer in a carpet. In this embodiment, one or more layers of fabric are attached to each side of the structured film to form a laminate.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

Structured films having tubular projection configurations similar to those of exemplary tubular projections 12 shown in FIGS. 2A-2F were prepared using the following procedure and an apparatus similar to exemplary apparatus 50 shown in FIG. 5. A polymer melt was extruded using a 6.35 cm (2.5 in) Davis-Standard single screw extruder (from Davis-Standard, LLC (Pawcatuck, Conn.) feeding into a 25.4 cm (10 in) PVC cast film extrusion die with a 508 µm (20 mils) die gap. The drop die configuration fed into a horizontal two roll nip. The tooling roll was 31.75 cm (12.5 in) in diameter and the backup steel roll was 30.48 cm (12 in) in diameter. The tooling consisted of a roll with an outer aluminum shell having cylindrical blind holes drilled into an outer surface. The holes were 398.8 µm (15.7 mils) in diameter with center-to-center spacing of 1.70 mm (67 mils) in a square array. The hole pattern was 20.3 cm (8.0 in) in width around the circumference of the tooling roll. The depth of the holes varied around the tooling roll. The circumference of the tooling roll was divided into three sections. The first section had holes drilled to a depth of 762 μm (30 mils), while the second section had holes drilled to a depth of 635 μm (25 mils) and the third section had holes drilled to a depth of 508 μm (20 mils).

Two commercially available propylene/ethylene impact co-polymers were used to form structured films: Huntsman PP AP5165-HA (MFI 65), and Huntsman PP 14S50V (MFI 50) (commercially available from Huntsman Polymers (The Woodlands, Tex.)). The following process conditions were used:

TABLE 1

Process Conditions

| Process Setting | Resin AP5165 HA | Resin 14S50V |
|---|---|---|
| Extruder & die temperature settings | 232.2° C. (450° F.) | 232.2° C. (450° F.) |
| Extruder Screw Speed | 20 rpm | 20 rpm |
| Tool roll temperature | 79.4° C. (175° F.) | 79.4° C. (175° F.) |
| Backup roll temperature | 65.6° C. (150° F.) | 65.6° C. (150° F.) |
| Nip Pressure | 25.7 kN per linear meter (147 pounds per linear inch) | 25.7 kN per linear meter (147 pounds per linear inch) |
| Line Speed | 12.2 mpm (40 fpm) | 12.2 mpm (40 fpm) |

Figure 2D:
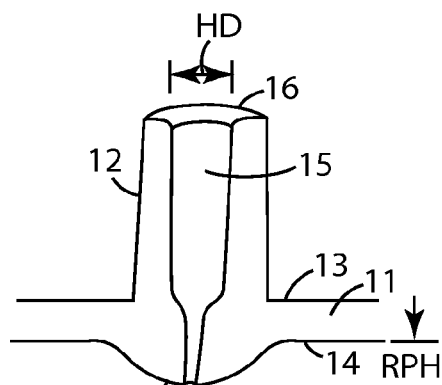
Figure 2E:
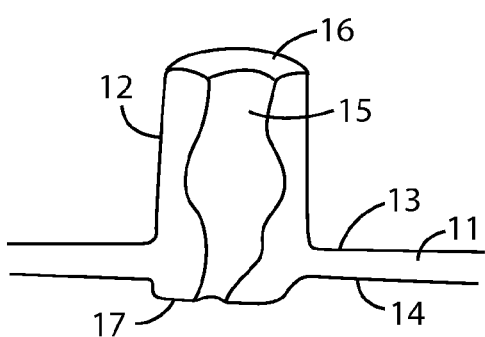
Figure 2F:
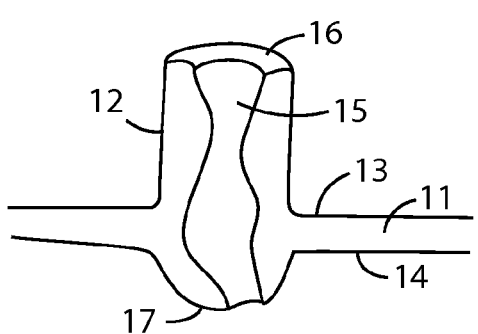

Digital microscope measurements of various structural features of the resulting sample structured films were taken. Referring to FIGS. 2C-2D for reference, the following measurements were taken as shown in Table 2 below. Samples designated as "-1" samples were processed using a hole depth of 762 μm (30 mils). Samples designated as "-2" samples were processed using a hole depth of 635 μm (25 mils). Samples designated as "-3" samples were processed using a hole depth of 508 μm (20 mils).

The resulting structured films had hollow tubular projections with through holes extending through the substantially planar film portion of the structured films. Pattern #1 with a hole depth of 762 μm (30 mils) provided the most consistent tubular projection features and through holes extending through the substantially planar film portion of the structured films. The other patterns occasionally produced through holes, and more frequently produced a bubble or blister on the second major surface of the structured films.

Figure 6:
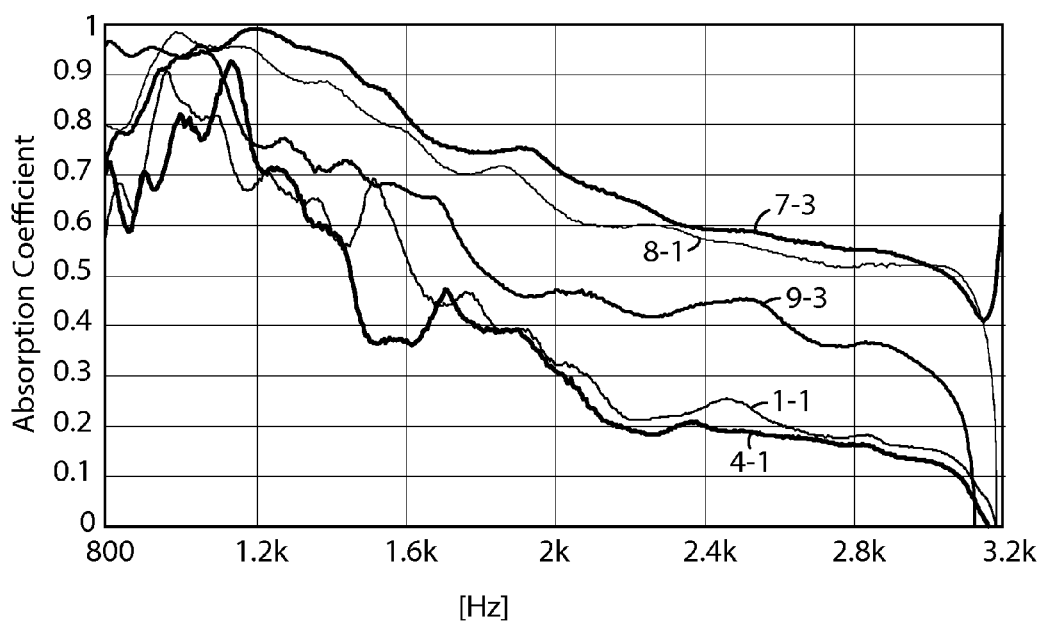
FIG. 6 graphically depicts sound absorption coefficient versus frequency for exemplary structured films of the present invention, and FIG. 7 graphically depicts impedance tube test data for exemplary structured films of the present invention.

Acoustic absorption tests were conducted on the samples. An impedance tube tester (Bruel & Kjaer Model 6205 using a 64 mm tube (Norcross, Ga.)) was used to determine an absorption coefficient at various frequencies. Tests were run using ASTM 1050 with a 25 mm space behind each structured film. Impedance tube test results for exemplary structured films of the present invention (Samples 1-1 and 4-1) are shown in FIG. 6.

Example 2

Structured films having tubular projection configurations similar to those of exemplary tubular projections 12 shown in FIGS. 2A-2F were prepared using a procedure and apparatus similar to that used in Example 1 above. A commercially available polypropylene thermoplastic resin was used to form structured films: Huntsman PP AP5165-HA with a MFI of 65. The following process conditions were used:

TABLE 3

Process Conditions

| Process Setting | Resin AP5165 HS | Resin AP5165 HS | Resin AP5165 HS |
|---|---|---|---|
| Extruder & die temperature settings | 190.5° C. (375° F.) | 190.5° C. (375° F.) | 190.5° C. (375° F.) |
| Extruder Screw Speed | 33 rpm | 35 rpm | 40 rpm |
| Tool roll temperature | 82.2° C. (180° F.) | 82.2° C. (180° F.) | 79.4° C. (175° F.) |
| Backup roll temperature | 93.3° C. (200° F.) | 93.3° C. (200° F.) | 79.4° C. (175° F.) |

TABLE 2

Sample Structured Film Measurements

| Measurement | Sample 1-1 | 2-2 | 3-3 | 4-1 | 5-2 | 6-3 |
|---|---|---|---|---|---|---|
| Projection Length, L | 693.4 μm (27.3 mil) | 500.4 μm (19.7 mil) | 464.8 μm (18.3 mil) | 685.8 μm (27.0 mil) | 469.9 μm (18.5 mil) | 505.5 μm (19.9 mil) |
| Substantially Planar Film Thickness | 114.3 μm (4.5 mil) | 104.1 μm (4.1 mil) | 121.9 μm (4.8 mil) | 124.5 μm (4.9 mil) | 129.5 μm (5.1 mil) | 116.8 μm (4.6 mil) |
| Hole Diameter (HD)[1] | 208.3 μm (8.2 mil) | 193.0 μm (7.6 mil) | 233.7 μm (9.2 mil) | 213.4 μm (8.4 mil) | 231.1 μm (9.1 mil) | 233.7 μm (9.2 mil) |
| Rear Projection Height (RPH)[2] | 160.0 μm (6.3 mil) | 185.4 μm (7.3 mil) | 193.0 μm (7.6 mil) | 104.1 μm (4.1 mil) | 213.4 μm (8.4 mil) | 172.7 μm (6.8 mil) |
| Bubble Width (BW)[3] | 228.6 μm (9.0 mil) | 515.6 μm (20.3 mil) | 487.7 μm (19.2 mil) | 53.3 μm (2.1 mil) | 457.2 μm (18.0 mil) | 205.7 μm (8.1 mil) |
| Bubble Wall Thickness (BWT)[4] | 0 μm (0 mil) | 58.4 μm (2.3 mil) | 48.3 μm (1.9 mil) | 0 μm (0 mil) | 20.3 μm (0.8 mil) | 0 μm (0 mil) |

[1] hole diameter (HD) was measured along an upper end (e.g., the first end) of a given tubular projection
[2] rear projection height (RPH) measured a length of a given tubular projection below a lower surface of the substantially planar film portion of the structure film
[3] bubble width (BW) measured a maximum width of a bubble within a given tubular projection
[4] bubble wall thickness (BWT) measured a thickness of a bubble wall along a lower end of a given tubular projection (a value of 0 indicates that the bubble was opened so that a hole extended completely through a given tubular projection)

TABLE 3-continued

| | Process Conditions | | |
|---|---|---|---|
| Process Setting | Resin AP5165 HS | Resin AP5165 HS | Resin AP5165 HS |
| Nip Pressure | 14.7 kN per linear meter (84 pounds per linear inch) | 14.7 kN per linear meter (84 pounds per linear inch) | 14.7 kN per linear meter (84 pounds per linear inch) |
| Line Speed | 18.3 mpm (60 fpm) | 15.2 mpm (50 fpm) | 13.7 mpm (45 fpm) |

Digital microscope measurements of various structural features of the resulting sample structured films were taken as described in Example 1. Results are shown in Table 4 below. As in Example 1, samples designated as "-1" samples were processed using a hole depth of 762 μm (30 mils), samples designated as "-2" samples were processed using a hole depth of 635 μm (25 mils), and samples designated as "-3" samples were processed using a hole depth of 508 μm (20 mils).

TABLE 4

| | Sample Structured Film Measurements | | |
|---|---|---|---|
| | | Sample | |
| Measurement | 7-3 | 8-1 | 9-3 |
| Projection Length, L | 449.6 μm (17.7 mil) | 670.5 μm (26.4 mil) | 396.2 μm (15.6 mil) |
| Substantially Planar Film Thickness | 88.9 μm (3.5 mil) | 99.1 μm (3.9 mil) | 193.0 μm (7.6 mil) |
| Hole Diameter (HD) | 139.7 μm (5.5 mil) | 175.3 μm (6.9 mil) | 287.0 μm (11.3 mil) |
| Rear Projection Height (RPH) | 142.2 μm (5.6 mil) | 142.2 μm (5.6 mil) | 165.1 μm (6.5 mil) |
| Bubble Width (BW) | 61 μm (2.4 mil) | 73.7 μm (2.9 mil) | 355.6 μm (14.0 mil) |
| Bubble Wall Thickness (BWT) | 0 μm (0 mil) | 0 μm (0 mil) | 20.3 μm (0.8 mil) |

The resulting structured films had hollow tubular projections with through holes extending through the substantially planar film portion of the structured films. Each of patterns #1, #2, and #3 provided consistent tubular projection features and through holes extending through the substantially planar film portion of the structured films.

Acoustic absorption tests were conducted on the samples as described in Example 1. Impedance tube test results for exemplary structured films of the present invention (Samples 7-3, 8-1, and 9-3) are shown in FIG. 6.

Example 3

Structured films having tubular projection configurations similar to those of exemplary tubular projections 12 show in FIGS. 2A-2F were prepared using the following procedure and an apparatus similar to exemplary apparatus 50 show in FIG. 5. A polymer melt was extruded using a 6.35 cm (2.5 in) Davis-Standard single screw extruder (from Davis-Standard, LLC (Pawcatuck, Conn.) feeding into a 30.5 cm (12 in) cast film extrusion die with a 508 um (20 mils) die gap. The drop die configuration fed into a horizontal two roll nip. The tooling roll was 31.75 cm (12.5 in) in diameter and the backup steel roll was 30.48 cm (12 in) in diameter. The tooling consisted of a roll with an outer aluminum shell having cylindrical blind holes drilled into an outer surface. The holes were 0.5 mm (19.7 mils) in diameter with center to center spacing of 1.70 mm (67 mils) in a square array. The hole pattern was 20.3 cm (8.0 in) in width around the circumference of the tooling roll. The depth of the holes varied around the tooling roll. The circumference of the tooling roll was divided into four sections. The first section had holes drilled to a depth of 1.143 mm (45 mils), while the second section had holes drilled to a depth of 965 um (38 mils), the third section had holes drilled to a depth of 787 um (31 mils) and the fourth section had holes drilled to a depth of 330 um (13 mils).

Commercially available propylene/ethylene impact co-polymer was used to form structured films: Huntsman PP AP5165-HA (MFI 65) (commercially available from Huntsman Polymers, The Woodlands, Tex.). The following process conditions were used:

TABLE 5

| Process Conditions | |
|---|---|
| Process Setting | Resin AP51265 HA |
| Extruder & die temperature settings | 190 C. (375 F.) |
| Extruder Screw Speed | 32 RPM |
| Tool Roll Temperature | 82 C. (180 F.) |
| Backup Roll Temperature | 93 C. (200 F.) |
| Nip Pressure | 12.9 kN per linear meter (74 pounds per linear inch) |
| Line Speed | 12.1 mpm (40 fpm) |

The process conditions in Table 5 were for optimized run conditions for hole pattern 2 at hole depth of 965 um (38 mils). Digital microscope measurements of various structural feature of the resulting sample structured film was taken. Referring to FIGS. 2C-2D for reference, the following measurements were taken as shown in table 6 below.

TABLE 6

| Sample Structured Film Measurements. | |
|---|---|
| Measurement | E060504-16 |
| Projection Length, L | 559 um (22 mil) |
| Substantially Planar Film Thickness | 81 um (3.2 mil) |
| Hole Diameter (HD)[1] | 147 um (5.8 mils) |
| Rear Projection Height (RPH)[2] | 350 um (13.8 mils) |
| Bubble Width (BW)[3] | 513 um (20.2 mils) |
| Bubble Wall Thickness (BWT)4 | 183 um (7.2 mils) |

The resulting structured film had hollow tubular projections with through holes extending through the substantially planar film portion of the structured film.

Figure 7:
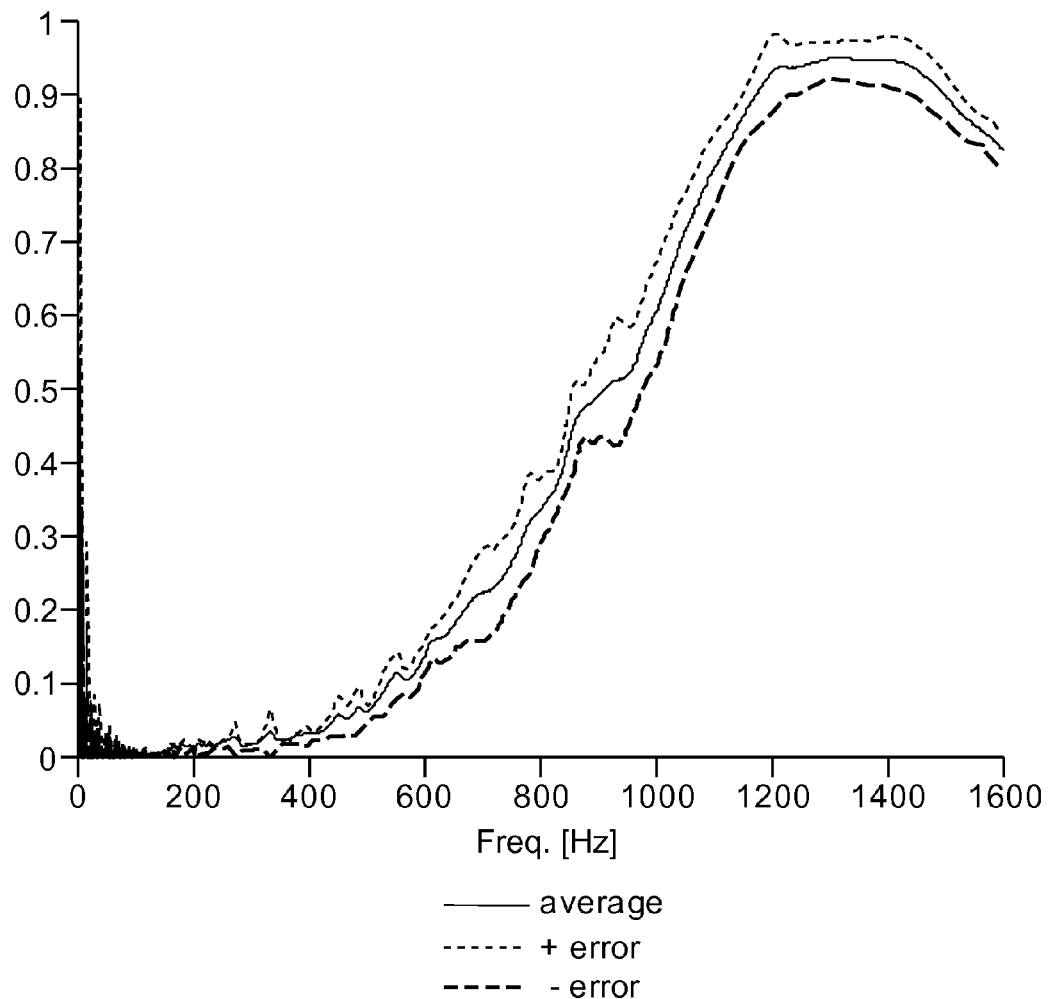

Acoustic absorption tests were conducted on the sample. An impedance tube tester (Bruel & Kjaer Model 6205 using a 64 mm tube (Norcross, Ga.)) was used to determine an absorption coefficient at various frequencies. Tests were run using ASTM 1050 with a 25 mm space behind each structured film. Impedance tube test results for exemplary structured films of the present invention (Sample E060504-16) is shown in FIG. 7

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An integral structured film comprising:
   a substantially planar film portion having a first major surface, a second major surface, and an average film portion thickness; and
   a plurality of tubular projections extending from said substantially planar film portion, wherein one or more tubular projections comprise:
   (i) a hole extending from a first projection end above said first major surface into or through said substantially planar film portion, wherein said hole has a projection hole diameter in a range from 25.4 μm (1 mil) to 254 μm (10 mil),
   (ii) a projection sidewall surrounding at least a portion of said hole, said projection sidewall having an outer projection sidewall surface, an inner projection sidewall surface, and a projection sidewall thickness, and
   (iii) a projection length extending a distance from said first projection end to said first major surface, wherein a ratio of said projection length to said average film portion thickness is at least about 3.5,
   wherein the projection sidewall thickness of at least a portion of said one or more tubular projections is equal to or greater than the average film thickness, and wherein said structured film is free of post-film forming, projection-forming orientation.

2. The structured film of claim 1, wherein said one or more tubular projections have a substantially similar projection length.

3. The structured film of claim 1, wherein said one or more tubular projections have a second projection end positioned below said second major surface.

4. The structured film of claim 1, wherein at least a portion of said one or more tubular projections have a hole extending through said substantially planar film portion.

5. The structured film of claim 1, wherein said structured film has dimensions as follows:
   an average film portion thickness ranging from about 76.2 μm (3 mil) to about 508 μm (20 mil);
   a projection length ranging from about 25.4 μm (1 mil) to about 1.27 cm (500 mil);
   a projection hole length ranging from about 101.6 μm (4 mil) to about 1.32 cm (520 mil); and
   a projection sidewall thickness ranging from about 25.4 μm (1 mil) to about 508 μm (20 mil).

6. The structured film of claim 1, wherein the ratio of said projection length to said average film portion thickness is at least about 4.0.

7. The structured film of claim 1, wherein said tubular projections are present along said substantially planar film portion at a tubular projection density of from about 10 projections/cm$^2$ to about 300 projections/cm$^2$.

8. The structured film of claim 1 in combination with a first additional layer positioned over and attached to said first projection ends of said tubular projections, a second additional layer positioned over and attached to said second major surface or said second projection ends of said tubular projections, or said first additional layer and said second additional layer.

9. The structured film of claim 1 in combination with a second additional layer positioned over and attached to said second major surface or said second projection ends of said tubular projections.

10. The structured film of claim 1 attached to a substrate, said substrate comprising a wall of a building, a ceiling of a building, a building material for forming a wall or ceiling of a building, a metal sheet, a glass substrate, a door, a window, a vehicle component, a machinery component, or an appliance component.

11. The structured film of claim 1 wherein one or more tubular projections have a first wall thickness at a projection base located proximate said first major surface, a second wall thickness at said first projection end, and a third wall thickness at a projection midsection located between said projection base and said first projection end, wherein the first wall thickness is greater than the second and third wall thicknesses, or the first wall thickness is greater than the second wall thickness and the second wall thickness is greater than the third wall thickness.

12. An integral structured film comprising:
    a substantially planar film portion comprising a thermoformable material having a first major surface, a second major surface, and an average film portion thickness; and
    a plurality of tubular projections extending from said substantially planar film portion, wherein one or more tubular projections comprise:
    (i) a hole extending from a first projection end above said first major surface into or through said substantially planar film portion, wherein said hole has a projection hole diameter in a range from 25.4 μm (1 mil) to 254 μm (10 mil),
    (ii) a projection sidewall surrounding at least a portion of said hole, said projection sidewall comprising said thermoformable material and having an outer projection sidewall surface, an inner projection sidewall surface, and a projection sidewall thickness, and
    (iii) an end-to-end projection length extending a distance from said first projection end to a second projection end below said second major surface, wherein said one or more tubular projections have an upper projection length extending a distance from said first projection end to said first major surface, wherein a ratio of said upper projection length to said average film portion thickness is at least about 3.5, and wherein said structured film is free of post film-forming, projection-forming orientation.

13. The structured film of claim 12, wherein said hole extends from said first projection end above said first major surface through said substantially planar film portion to said second projection end providing an opening through said structured film.

14. The structured film of claim 12, wherein said one or more tubular projections have a bubble portion in fluid communication with said hole, said bubble portion being (i) within said substantially planar film portion, (ii) below said second major surface, or (iii) both (i) and (ii).

15. The structured film of claim 14, wherein a lower portion of said bubble portion is removed to provide an opening extending through said structured film from said first projection end to said second projection end.

16. A method of absorbing sound in an area, said method comprising the steps of:
    surrounding at least a portion of the area with the structured film of claim 1.

* * * * *